United States Patent [19]

Holtkamp, Jr.

[11] Patent Number: 5,673,511
[45] Date of Patent: Oct. 7, 1997

[54] PLANT STAND WITH SELF-WATERING TRAYS

[75] Inventor: Reinhold Holtkamp, Jr., Nashville, Tenn.

[73] Assignee: Holtkamp Greenhouses, Inc., Nashville, Tenn.

[21] Appl. No.: 580,519

[22] Filed: Dec. 28, 1995

[51] Int. Cl.$^6$ .................................................. A01G 9/02
[52] U.S. Cl. .................................. 47/18; 47/39; 47/87
[58] Field of Search ........................ 47/18 R, 39 P, 47/39 S, 82, 86, 87, 60 R, 60 NL

[56] References Cited

U.S. PATENT DOCUMENTS

| | | | |
|---|---|---|---|
| 4,236,353 | 12/1980 | Sorenson | 47/60 R |
| 4,255,896 | 3/1981 | Carl | 47/39 S |
| 4,597,550 | 7/1986 | Rice, Sr. | 47/39 P |
| 4,887,388 | 12/1989 | Waltel, Jr. | 47/18 |
| 4,932,159 | 6/1990 | Holtkamp, Sr. | |
| 5,193,305 | 3/1993 | Holtkamp, Jr. | |
| 5,481,825 | 1/1996 | Aoyama | 47/18 |

FOREIGN PATENT DOCUMENTS

| | | | |
|---|---|---|---|
| 1209865 | 12/1959 | Germany | 47/39 S |
| 1941315 | 8/1969 | Germany | 47/87 |
| 3130698 | 2/1983 | Germany | 47/87 |
| 1720566 | 3/1992 | U.S.S.R. | 47/87 |
| 1771402 | 10/1992 | U.S.S.R. | 47/18 R |
| 9005447 | 5/1990 | WIPO | 47/87 |
| 9303657 | 3/1993 | WIPO | 47/18 |

*Primary Examiner*—Terry Lee Melius
*Assistant Examiner*—Joanne C. Downs
*Attorney, Agent, or Firm*—Foley & Lardner

[57] ABSTRACT

A self-watering tray for supporting and displaying a plurality of potted plants which can be watered from a water reservoir in the bottom of the tray, the tray comprising a plurality of wall sections which define spaced openings in the tray, each wall section being provided with a support located above the reservoir for supporting the potted plant at or above the water, and being laterally open to the adjacent wall sections below the supports to provide a continuous reservoir channel below the supports and pots, through which water can circulate for watering plants by capillary action.

14 Claims, 4 Drawing Sheets

5,673,511

PLANT STAND WITH SELF-WATERING TRAYS

BACKGROUND OF THE INVENTION

The present invention relates to a plant stand for displaying plants, and relates more particularly to a plant stand with unique self-watering trays by means of which potted plants can be more satisfactorily displayed and self-watered to maintain the plants in a fresh condition.

Prior to the present invention, potted plants such as African Violets were typically displayed on benches or shelves, an arrangement having several disadvantages. First, although the initial display may have been attractive and the plant material freshly watered, over a period of time the picking up and putting back of the potted plants for inspection by the potential customer adversely affects the appearance of the display.

Further, proper watering of the plants has been a consistent problem, particularly at the large retail store level where watering is inconsistent in time and non-uniform in amount, leading to a degradation of the plant material and consequent difficulty in selling the plant material at fair prices.

Even if watered at proper intervals, the type of watering is not always conducive to maintaining the plants in optimum condition prior to sale. Many species of plants, perhaps the prime example of which is African Violets, prefer bottom watering, and watering from the top in inconsistent amounts and intervals can impair both the quality and appearance of the plants. As plants such as African Violets are presently displayed, there is no provision for bottom watering which the plants prefer.

A further problem is that by displaying the plants on benches or shelves, they are not optimally displayed for viewing, which distracts from potential sales. This is exacerbated when the plants are not adequately cared for.

SUMMARY OF THE INVENTION

The plant stand of the present invention is designed to overcome the noted disadvantages. In accordance with the invention, the potted plants are more attractively displayed for customer viewing and inspection, and plants are watered from below to provide proper amounts of water for maintaining the plant material in optimum condition.

In accordance with the invention, at least one self-watering tray is mounted on a supporting shelf forming part of the stand, with the tray being formed with spaced individual openings or compartments, one for each plant. The tray is configured to define a bottom watering channel beneath the plants so that the plants are continuously watered from the bottom through capillary action. The openings are longitudinally spaced so that the plants are continually maintained spaced apart which enhances the display of the plants.

In accordance with a further feature of the invention, the openings in the tray which receive the pots are inclined relative to a vertical axis so that the plants are angled or tilted toward the customer at each side of the stand. This greatly enhances not only the display but also the ease in which the customer can remove a plant from its opening and replace the plant in the same opening if the plant is not purchased. In this manner, the plants are uniformly spaced and attractively displayed at all times.

With further regard to the particular construction of the tray, it is elongated and formed with a series of spaced openings extending longitudinally along each side of the tray. Each opening is defined at the bottom by a supporting flange or shoulder, all of which are at the same inclination and level so that the plants are displayed at the same height.

There are preferably two rows of openings in each tray, with the openings in one row being staggered relative to the openings in the other row. This automatically spaces the plants so that they can be displayed without crowding. This can be enhanced by wrapping the plants in paper or plastic sleeves, which limit the diameter of the plant for display purposes. The plants are inclined or tilted toward the potential customer which makes it easier either to view the plants or to actually pick up a plant for inspection and to replace the plant in the same opening if the plant is not purchased. Preferably, two trays are mounted on each shelf, with the plants on each being tilted outwardly to enhance the display at both sides of the stand.

Self-watering of the plants is effected through the channel described, with the water level preferably not being higher than the bottommost edge of the pot when positioned in the opening. In this manner, the pot is entirely above the water supply, and a wick assembly is provided in each pot by means of which each pot can be watered by capillary action. The water supply can be replenished as necessary, and the amount of water to be added can be easily determined, based on the lowermost point or edge of each pot. If the tray is entirely filled with plants, one plant can be removed and water added to the channel in the amount necessary.

In order to avoid overwatering of the plants, an overflow spigot is provided at one end or side of the tray through which water can be discharged when the water channel is filled to a point above the spigot. An overflow tray is preferably mounted on the side of the plant stand adjacent the overflow spigot to receive water overflow. The tray can be temporarily mounted in place prior to water replenishment, and removed along with any overflow water after the watering is completed.

The plant stand preferably comprises a series of vertical corner posts and support shelves mounted on and secured to the corner posts at vertically spaced intervals. Support shelves provide support for the trays, two of which are preferably mounted on each support, and certain shelves can effectively serve as display shelves. For example, a typical display stand might have four shelves, with the middle two displaying plant material on trays, and the top and bottom shelves providing space for storing other products, such as fertilizer, potting soil, and the like. The construction of the corner posts and supporting shelves is such that the stand can be quickly assembled and disassembled. An awning cover preferably is positioned at the top of the stand to provide an attractive appearance.

A further feature of the tray construction is that it can be made of single part configuration and can be quickly and easily cleaned. By removing plants from the tray, it can be removed, rinsed out, and replaced.

These and other objects of the invention will be apparent as the following description proceeds with particular reference to the application drawings.

DETAILED DESCRIPTION OF THE PREFERRED EMBODIMENTS

Figure 1:
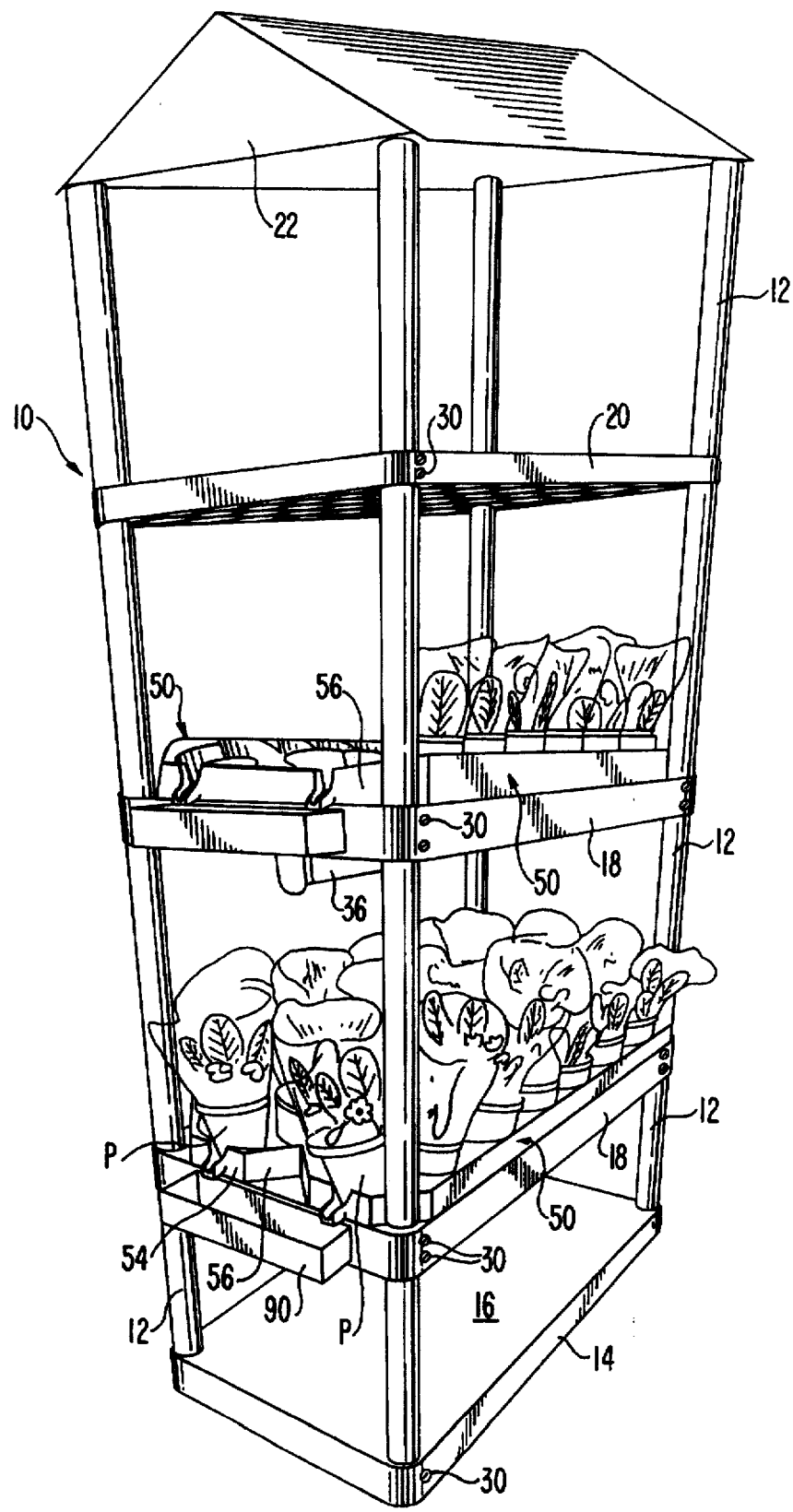
FIG. 1 is a front perspective of the plant stand in accordance with the present invention, with pot-supporting trays being shown on two of the shelves of the stand.

Referring to the application drawings, wherein like parts are indicated by like reference numerals, and initially to FIG. 1, the plant stand in accordance with the present invention is generally indicated at 10, and comprises a plurality of post sections commonly designated at 12, a bottom shelf 14 having a flat, top surface 16, tray-supporting shelves commonly designated at 18, a top shelf 20 adapted to contain products to be merchandised with the plants, and, in the form shown, a top canopy 22 which aesthetically enhances the appearance of the stand. Top shelf 20 is preferably provided with a flat surface similar to bottom shelf 14 for displaying merchandise which can be sold with the plants, such as potting soil, fertilizer, containers into which the pots can be placed after sale for self-watering, etc. Since the trays containing the potted plants must be displayed at heights which are visible and accessible to potential customers, the remaining shelf space at the top and bottom of the stand can be conveniently utilized for merchandise of the type mentioned.

As noted, the corner supporting posts commonly designated at 12 comprise a plurality of individual post sections each of which has a height equal to the desired distance between the tray-supporting bottom and top shelves. To assemble the bottommost corner posts 12, post-receiving openings are formed in the bottom shelf 14 adjacent each corner, with the openings not extending the full thickness of the shelf 14. The posts are then inserted in such openings and retained by set screws 30 which extend through threaded openings in the shelf into engagement with the posts so that the posts can be firmly secured in position.

The tray-supporting shelves 18 are mounted in a similar manner. Adjacent the corner of each shelf are openings (shown in dashed lines in FIG. 2), with the posts engaging the bottoms of such openings. Similar set screws commonly designated at 30 are used to secure the shelf 18 both to the posts below and above the shelf. The uppermost tray-supporting shelf 18 is mounted in a similar manner, as is the top shelf 20. The canopy 22 can be mounted on the top corner posts in any suitable manner to position the canopy.

It will thus be seen that the stand 10 can be easily assembled with nothing more than a screwdriver, with the shelves being positioned in place starting at the bottom as described. Although the described construction is preferred for ease of assembly, it will be understood that the corner posts can be vertically coextensive with the height of the stand, and the shelves vertically positioned and set. However, the preferred form not only provides ease of assembly, but also more rigid support for each shelf since retention is primarily through the corner posts.

The tray-supporting shelves 18 can be of any suitable form. Preferably, each shelf 18 is comprised of an enlarged corner section at which the corner posts are supported, a peripheral wall, and an intermediate longitudinal wall. Positioned between the peripheral and intermediate walls is a grid assembly comprised of longitudinally and transversely extending interconnected grid members. The shelves 18 are of rigid yet lightweight construction, preferably being made of a suitable rigid plastic material. In addition, the open construction of the grid makes it easy for the grid to support accessory equipment suitable for use with the plant stand. For example, in FIG. 1 a fluorescent light fixture 36 is suspended from the upper shelf 18 for illuminating the plants P supported on the shelf 18 immediately below. If necessary or desirable, a similar fixture can be mounted on the undersurface of the top shelf 20 for illuminating plants supported by the uppermost shelf 18.

Figure 2:
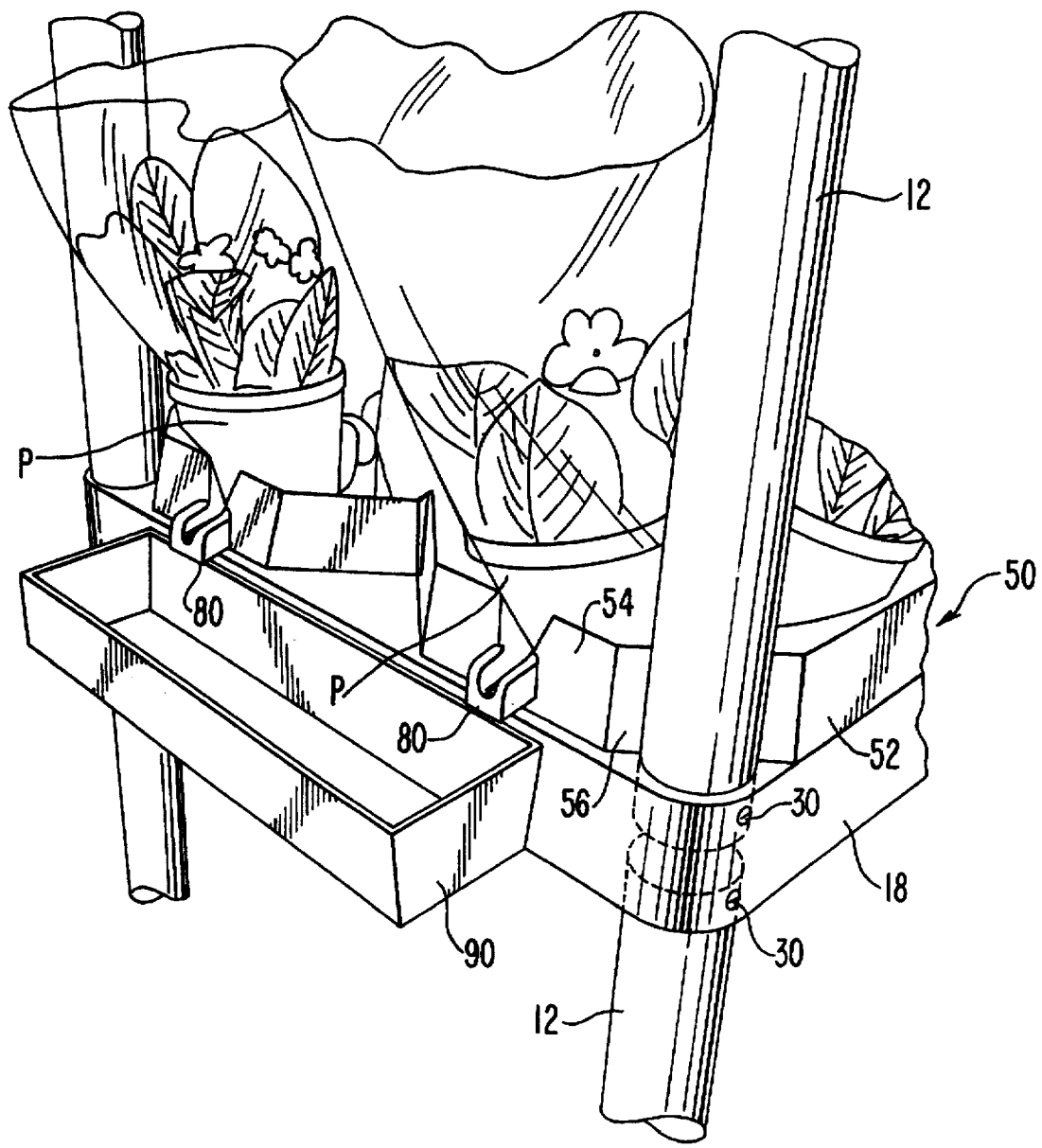
FIG. 2 is an enlarged, fragmentary perspective view showing one end of the stand and the trays and supported pots at such end.

The side and end walls of each tray-supporting shelf 18 are exteriorly exposed, and should be appropriately finished. The interior construction of the shelf is less important from an appearance standpoint, but desirably has rigid yet lightweight construction. As shown in FIGS. 1 and 2, each shelf 18 support two trays, the details of which will be presently described.

Figure 3:
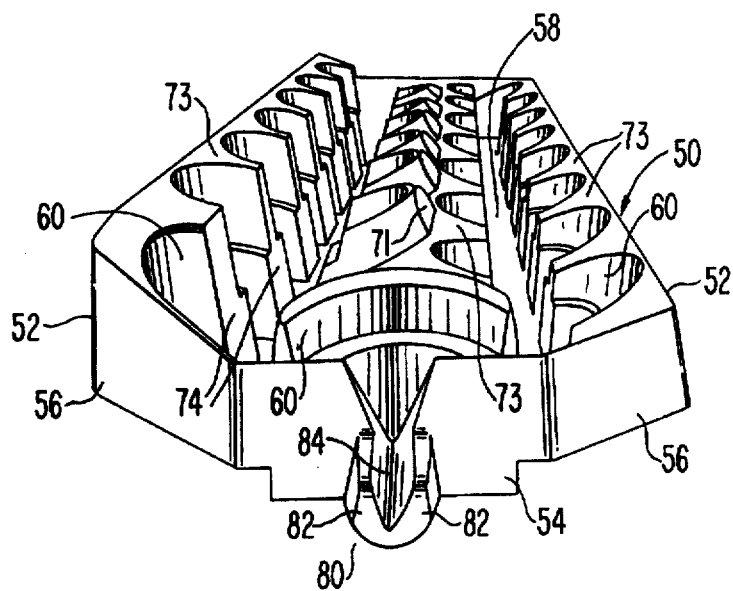
FIG. 3 is a perspective end view of an entire tray.
Figure 5:
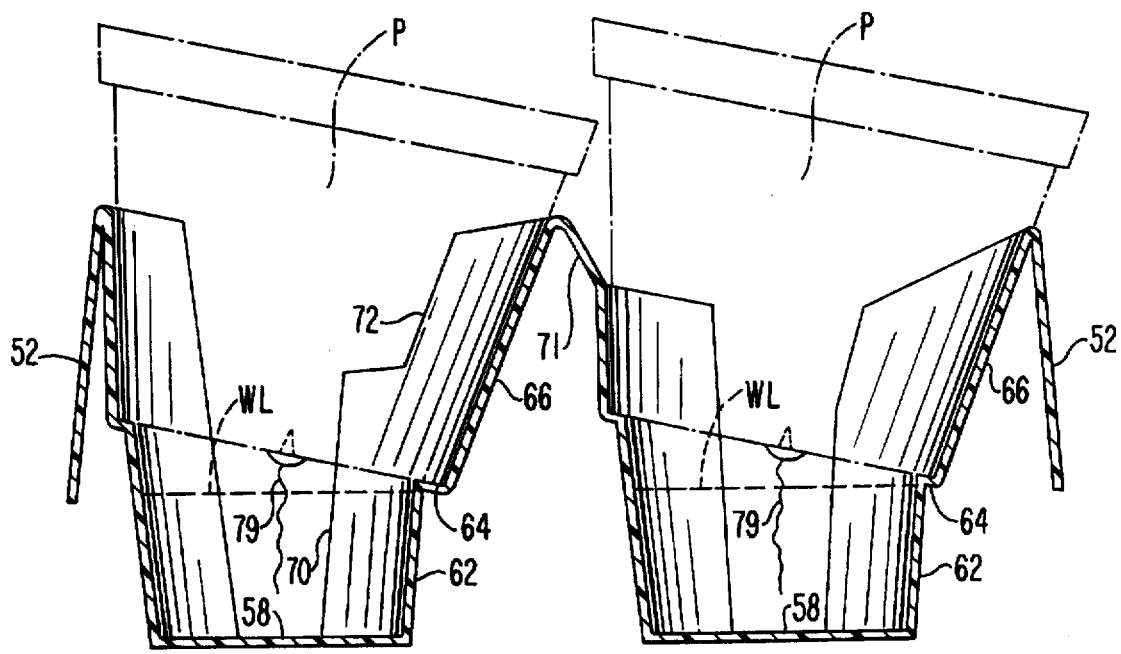
FIG. 5 is a cross-sectional view taken on line 5—5 of FIG. 4.
Figure 4:
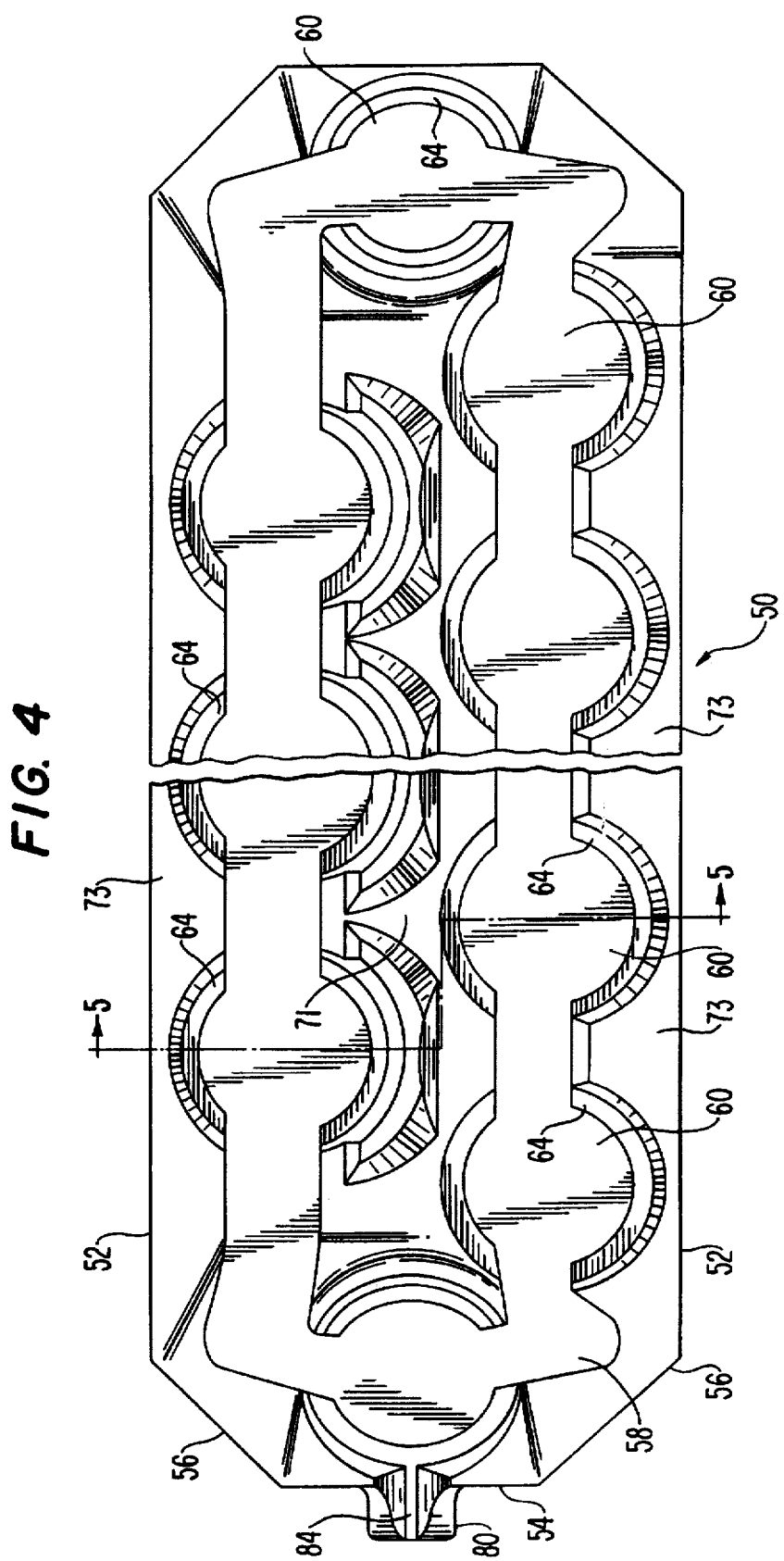
FIG. 4 is a fragmentary top plan view of the tray shown in FIG. 3.

As shown in FIGS. 3–5, each tray, generally indicated at 50, is defined by opposed sidewalls 52 comprising longitudinally extending skirt-like flanges which are exteriorly exposed, opposite end walls 54 oriented generally perpendicular to the side walls 52, and diagonal recessed corner sections 56. The corner sections are provided to accommodate the corner posts 12 when a pair of trays are positioned on the shelf 18, as shown in FIGS. 1 and 2. The tray further includes a bottom wall 58 which defines the bottom of the water channel. The entire tray is preferably of one piece construction, formed from a suitable plastic material and produced in a molding operation. A protective coating such as paint is applied to the exterior surfaces for aesthetic purposes and also to provide a washable, wear-resistant surface.

Formed in each tray are longitudinally spaced and transversely offset openings commonly designated at 60, with seven of such openings being formed along one side and six on the other. As clearly seen in FIG. 4, the openings along one side wall are longitudinally offset from the openings formed along the opposed side wall whereby plant material can be positioned in all of the openings without crowding the foliage or flowers. Openings 60 are also provided at each end of the tray.

Each opening 60 is configured to comprise a conical lower section 62, the top of which is defined by a supporting flange 64 formed at an angle relative both to the horizontal and the vertical axis of lower section 62. An upper conical section 66 is integrally formed with the flange 64 and extends upwardly therefrom, with the axis of the conical section 66 being perpendicular to the plane of the flange 64. When a pot P is positioned in each section 66, it is closely received by the sidewalls of the section 66 and is vertically offset in the same direction, with the pot being supported by the flange 64.

As can be seen in FIG. 4, the offsetting of openings 60 in one row relative to the other row avoids contact and crowding of the pots positioned in the openings 60. All openings in a single tray are oriented in the same direction so as to expose the plant material more directly to a potential customer standing at that side of the stand, e.g., from the right as viewed in FIG. 5. The opening 60 at each end of the tray is configured to orient or tilt the pot toward the exterior of the stand so that the pot can be more easily viewed.

The supporting flanges 64 and sections 66 comprise two separate, arcuate sections, separated by opposed openings comprising a bottom opening 70 the bottom of which is defined by the bottom wall 58 of the tray, and an upper, relatively enlarged opening 72. The pot is thus supported in arcuate shaped side wall sections the respective ends of which extend to the bottom wall 58 of the tray. The lower openings 70 provide a continuous water channel defined by the bottom wall 58 and end walls of the tray, with the channel forming an elongated and continuous loop through the tray under the pots.

As previously indicated, the tray is preferably integrally formed by molding to reduce unit costs, and the transversely spaced rows are interconnected by webs 71 which merge into top sections 73 which extend between openings 60. There are similar top surface sections 73 at each side of the tray to define and space the openings. Each top section 73 is merged into channel defining sections commonly designated at 74 which space and partially define the openings 60. The wall sections defining the opening 60, the interconnecting sections 71, 73 and 74, and the exterior walls 52, 54 and 56, together with the bottom wall 58, define an integrally formed tray in which pots are supported at a height intermediate the vertical dimension of the tray, and supported at an angle relative to the vertical so that the plants are exposed more directly to the potential customer. A continuous loop water channel is formed beneath all of the pot-supporting openings for receiving water or nutrient-enriched liquid for feeding the pots by capillary action.

In order to self-water the potted plants by capillary action, one or more wicks, commonly designated at 79 in FIG. 5, are inserted in openings provided therefor in the bottom wall of each pot. The wicks can be inserted in the pots by any suitable insertion devices, for example, those shown in U.S. Pat. Nos. 4,932,159 or 5,193,305. Regardless of how inserted, the wicks are embedded in the growing media in the pots and extend downwardly into the water channel thereby to transmit water or liquid by capillary action into the growing media in the pots. In this manner, plants that prefer bottom watering, such as African Violets, can be watered in a very convenient manner.

The water or liquid in the channel is preferably maintained at an upper level slightly below the lowermost portion of supporting flange 64, with the water level being shown at WL in FIG. 5. To facilitate filling up to but not above that level, a label or other appropriate indicia can be formed on or secured to one of the interior walls of the tray outside one or more of the openings 60. In order to prevent overfilling, and possible submerging the bottoms of the pots in water, an overflow spigot 80 is formed in one end wall 54 of the tray. The spigot is comprised of side walls 82 (FIG. 3) which centrally converge and are interconnected at their bottoms to define a discharge channel 84 which is at or just below the lowermost portion of the pot supporting flanges 64. Thus, when the water is replenished and the water reaches the level approximately at the bottom of each pot, any further water is discharged through the overflow spigot 80 thereby precluding immersing the pots in water.

In order to accommodate overflow water discharged through the overflow spigots 80, an overflow tray 90 can be removably secured to the end walls of the shelves 18 (FIGS. 1 and 2) by any suitable means, such as, for example, supporting clips or the like. When water is to be replenished, the tray 90, which per se forms no part of the present invention, can be removably attached to the adjacent end wall of the shelf 18, and the channel filled to the desired level. Any excess water flows through the overflow spigots into the tray 90 which, after the overflow has been collected, can be removed and the excess water discarded. The tray need not be reinstalled until further usage.

As illustrated and above described, two trays 50 are preferably mounted on each shelf 18, and the trays can be simply dropped in place. The beveled corners 56 of the trays permit the trays to accommodate essentially the full width and length of each supporting shelf 18 thereby to maximize the area for supporting plants. The beveled corners 56 also serve to prevent shifting of the trays when the trays are in place. The plants, preferably sleeved for the reasons noted above, can then be positioned in the openings 60, with each plant being tilted or inclined toward the side at which the plants are viewed by the potential customer. Both rows of openings 60 of each tray are oriented in the same direction, and the openings in respective rows are longitudinally spaced. This provides a complete utilization of the space provided without any potential interference from the foliage or flowers of adjacent plants. The potted plants can be quickly and easily positioned in the openings, and can be removed by potential customers for inspection. If not selected, the plant can be placed back in the same location, and plants sold can be replaced by fresh material. In either event, the water level is maintained in the water channel so that the plants are continually watered by capillary action. In this manner, plant material is maintained in a continuously fresh condition, thus extending significantly the shelf life of perishable plants and consequently minimizing the loss of plants.

It will be understood that in the tray 50 shown at the left in FIG. 1, the openings 60 will be inclined to the left of vertical to enhance viewing by those customers viewing the display from the left of the stand, again with reference to FIG. 1. In this regard, the trays 50 are interchangeable and can be turned end for end to position the pots in the desired orientation. To achieve maximum flexibility, overflow spigots can be provided at each end of the tray to accommodate the particular mounting for the tray. In the event only a single overflow spigot is provided, it may be necessary to provide a removable overflow tray at each end of the stand to accommodate overflow during filling.

It will thus be seen that the invention uniquely provides several advantages. The potted plants are automatically spaced in the tray for optimum viewing by the potential customer, and when plants are sold, additional plants can be placed in the display. The channel in the bottom of the tray can be filled as necessary, for example, once a week, and plants are continually watered by capillary action by means of wicks extending downwardly from the pots into the water supply. Filling of the trays with water can be accomplished either before the plants are positioned in place, or by simply withdrawing one of the plants and filling the channel through such opening to the maximum level. If the water exceeds that level, it is drained from the tray through the discharge spigots into a temporarily positioned overflow tray for dumping.

Although the tray illustrated in the application drawing is specifically designed to receive 4" potted plants, it will be understood that plants in pots of varying size, larger or smaller, could be accommodated. Further, the tray described and illustrated is of a size to accommodate approximately fifteen potted plants although it will be understood that the size of the tray could be modified to accommodate fewer or greater numbers of plants. The size of each tray is typically chosen to accommodate displays of other products, for example, accessory products such as fertilizer, potting soil, and the like.

The particular tilt angle for the pot is not critical to the present invention. In the form shown in FIG. 5, the orientation of the upper sections 66 of the tray and thus the pots are approximately 10–15 degrees relative to the vertical. That angle or range of angles has been found to optimally enhance merchandising, although the function of the tray is clearly not dependent upon the particular tilt angle, which could be more or less than the range indicated.

Further, the tray 50 is preferably made in a onepiece configuration by known molding techniques, although the tray could be made of two or more connected components without detracting from the concepts of the invention. The tray is preferably of relatively light weight plastic material. The material and configuration, and the manner in which the tray is supported on the shelves 18, all serve to permit the tray to be easily removed, cleaned and replaced as necessary.

All of the other described components, including the posts and supporting shelves are also preferably made of plastic to reduce the cost and weight of the stand, reduce maintenance requirements, and facilitate cleaning.

It will be understood that various modifications might suggest themselves to one skilled in the art, without, however, departing from the concepts of the invention as defined in the appended claims.

What is claimed is:

1. A self-watering tray for supporting and displaying a plurality of potted plants which can be watered from the bottom of the tray, said tray comprising:

side and end walls and a bottom wall which define a reservoir adapted to contain water, a plurality of wall sections defining spaced openings in said tray, each wall section being provided with a supporting flange located above the reservoir for supporting the bottom of a potted plant above the reservoir, each said wall section being laterally open to adjacent wall sections below said supporting flanges thereby to provide a continuous reservoir channel below said supporting flanges, whereby water can circulate through said channel for watering plants by capillary action.

2. The self-watering tray of claim 1, wherein said openings defined by said wall sections are longitudinally spaced and provided along both sides of said tray, with each opening being staggered longitudinally relative to the adjacent opening so as to facilitate insertion and removal of the pots and enhance viewing of the pots, and wherein each supporting flange is at an angle relative to the horizontal, the angle being such that pots positioned in said openings are inclined toward the side from which they are viewed.

3. The self-watering tray of claim 1, wherein the wall sections defining each opening each comprise a lower section having a bottom wall defining the reservoir channel, said lower section being formed with said supporting flange at the upper end, said supporting flange being angled relative to the horizontal so as to provide non-vertical support for the pot, and an upper conical section extending upwardly from and formed integrally with said supporting flange, said upper conical section comprising opposed arcuate walls which extend upwardly generally perpendicular to said supporting flange so that the pot is supported in an angled position.

4. The self-watering tray of claim 1, wherein at least one end wall of said tray is formed with a spigot having an elevation approximately that of said supporting flanges, said spigot communicating with said reservoir channel whereby when said channel is filled with water to a level above said supporting flanges, water is drained from said tray through said spigot, thereby precluding the water in said reservoir channel from reaching a level above the bottoms of the pots.

5. The self-watering tray of claim 1, wherein said tray is integrally formed of one-piece, rigid plastic material.

6. The self-watering tray of claim 1, wherein the side walls of said tray are generally parallel and extend longitudinally of the tray, said end walls are generally perpendicular to said side walls, and further including beveled corner sections separating said side and end walls and facilitating mounting of said tray.

7. The self-watering tray of claim 1, wherein said tray comprises a first set of longitudinally aligned and spaced openings adjacent a first side wall of said tray, a second set of longitudinally aligned and spaced openings adjacent the opposed side wall of said tray, and an opening at each end of said tray, said reservoir extending in a continuous loop through the tray beneath the supporting flanges.

8. The self-watering tray of claim 7, wherein said openings in said first and second sets are longitudinally staggered, and said supporting flanges are aligned in the same outward direction so that the pots are inclined in the direction of one of said sidewalls of said tray.

9. A plant stand with self-watering trays for watering of plants by capillary action, the stand comprising:

corner posts at each corner of the stand;

a bottom shelf and a top shelf to which said corner posts are operatively connected for spacing and supporting said corner posts;

at least one tray-supporting shelf positioned intermediate said bottom and top shelves and operatively connected to said corner posts, and at least one self-watering tray positioned and supported on said tray-supporting shelf, said tray having side, end and bottom walls defining a water reservoir in the bottom of the tray, and wall sections defining spaced openings to receive potted plants, each of said wall sections being provided with a supporting flange located above the reservoir for supporting the bottom of a pot positioned in the opening defined by that wall section, each wall section having opposed lateral openings below said supporting flanges and communicating with said reservoir thereby to provide a continuous reservoir channel below said openings, whereby when pots provided with wicks extending from bottom walls of the pots are positioned in said openings, the wicks extend into the reservoir thereby enabling the potted plants to be watered by capillary action.

10. The self-watering tray of claim 9, wherein said openings defined by said wall sections are longitudinally spaced and provided along both sides of said tray, with each opening being staggered longitudinally relative to the adjacent opening so as to facilitate insertion and removal of the pots and enhance viewing of the pots, and wherein each supporting flange is at an angle relative to the horizontal, the angle being such that pots positioned in said openings are inclined toward the side from which they are viewed.

11. The self-watering tray of claim 9, wherein the wall sections defining each opening comprise a lower section having a bottom wall defining the reservoir channel, said lower section being formed with said supporting flange at the upper end, said supporting flange being angled relative to the horizontal so as to provide non-vertical support for the pot, and an upper conical section extending upwardly from and formed integrally with said supporting flange, said upper conical section comprising opposed arcuate walls which extend upwardly generally perpendicular to said supporting flange so that the pot is supported in an angled position.

12. The self-watering tray of claim 9, wherein at least one end wall of said tray is formed with a spigot having an elevation approximately that of said supporting flanges, said spigot communicating with said reservoir channel whereby when said channel is filled with water to a level above said supporting flanges, water is drained from said tray through said spigot, thereby precluding the water in said reservoir channel from reaching a level above the bottoms of the pots.

13. The self-watering tray of claim 9, wherein said tray comprises a first set of longitudinally aligned and spaced openings adjacent a first side wall of said tray, a second set of longitudinally aligned and spaced openings adjacent the opposed side wall of said tray, and an opening adjacent each end of said tray, said reservoir extending in a continuous loop through the tray beneath the supporting flanges.

14. The self-watering tray of claim 13, wherein said openings in said first and second sets of openings are longitudinally staggered and said supporting flanges are aligned in the same direction so that the pots are inclined in the direction of one of said sidewalls of said tray.

* * * * *